US012689825B2

(12) United States Patent
Sakurabu et al.

(10) Patent No.: US 12,689,825 B2
(45) Date of Patent: Jul. 21, 2026

(54) DETECTION METHOD, IMAGING APPARATUS, AND PROGRAM

(71) Applicant: FUJIFILM Corporation, Tokyo (JP)

(72) Inventors: Hitoshi Sakurabu, Saitama (JP); Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 129 days.

(21) Appl. No.: 18/600,784

(22) Filed: Mar. 11, 2024

(65) Prior Publication Data

US 2024/0214677 A1 Jun. 27, 2024

Related U.S. Application Data

(63) Continuation of application No. PCT/JP2022/027947, filed on Jul. 15, 2022.

(30) Foreign Application Priority Data

Sep. 30, 2021 (JP) ................................. 2021-161788

(51) Int. Cl.
*H04N 23/67* (2023.01)
*G02B 7/34* (2021.01)
(Continued)

(52) U.S. Cl.
CPC ........... *H04N 23/672* (2023.01); *G06V 10/82* (2022.01); *H04N 23/61* (2023.01)

(58) Field of Classification Search
CPC ...... H04N 23/672; H04N 23/61; H04N 23/60; G06V 10/82; G02B 7/34; G03B 13/36; G03B 15/00
See application file for complete search history.

(56) References Cited

U.S. PATENT DOCUMENTS

2017/0094153 A1 3/2017 Wang et al.
2019/0387175 A1* 12/2019 Kikuchi ............... H04N 23/959
(Continued)

FOREIGN PATENT DOCUMENTS

JP 2007065002 3/2007
JP 2016153984 8/2016
(Continued)

OTHER PUBLICATIONS

"International Search Report (Form PCT/ISA/210) of PCT/JP2022/027947", mailed on Oct. 4, 2022, with English translation thereof, pp. 1-5.
(Continued)

*Primary Examiner* — Ahmed A Berhan
(74) *Attorney, Agent, or Firm* — JCIPRNET

(57) ABSTRACT

There is provided a detection method used in an imaging apparatus including an imaging element that has a first pixel for generating a first signal and second and third pixels for generating second and third signals for detecting a phase difference, and a memory that stores a machine-trained model, the detection method including: an input step of inputting a second image based on the second signal, a third image based on the third signal, or a fourth image based on the second signal and the third signal to the model as an input image; a subject detection step of detecting a subject included in a first image generated by the first signal, through the model on which the input step is executed; and a focusing position detection step of detecting a focusing position with respect to the subject, through the model on which the input step is executed.

13 Claims, 15 Drawing Sheets

(51) Int. Cl.
    *G06V 10/82*         (2022.01)
    *H04N 23/61*      (2023.01)

(56)           References Cited

U.S. PATENT DOCUMENTS

| | | | |
|---|---|---|---|
| 2020/0260014 A1* | 8/2020 | Miyatani | H04N 25/704 |
| 2022/0201183 A1 | 6/2022 | Okuike | |

FOREIGN PATENT DOCUMENTS

| | | |
|---|---|---|
| JP | 2019215489 | 12/2019 |
| JP | 2020198470 | 12/2020 |
| WO | 2019073814 | 4/2019 |

OTHER PUBLICATIONS

"Written Opinion of the International Searching Authority (Form PCT/ISA/237) of PCT/JP2022/027947", mailed on Oct. 4, 2022, with English translation thereof, pp. 1-12.
"Notice of Reasons for Refusal of Japan Counterpart Application", issued on Jan. 6, 2026, with English translation thereof, p. 1-p. 9.

* cited by examiner

HORIZONTAL POOLING

FIG. 13

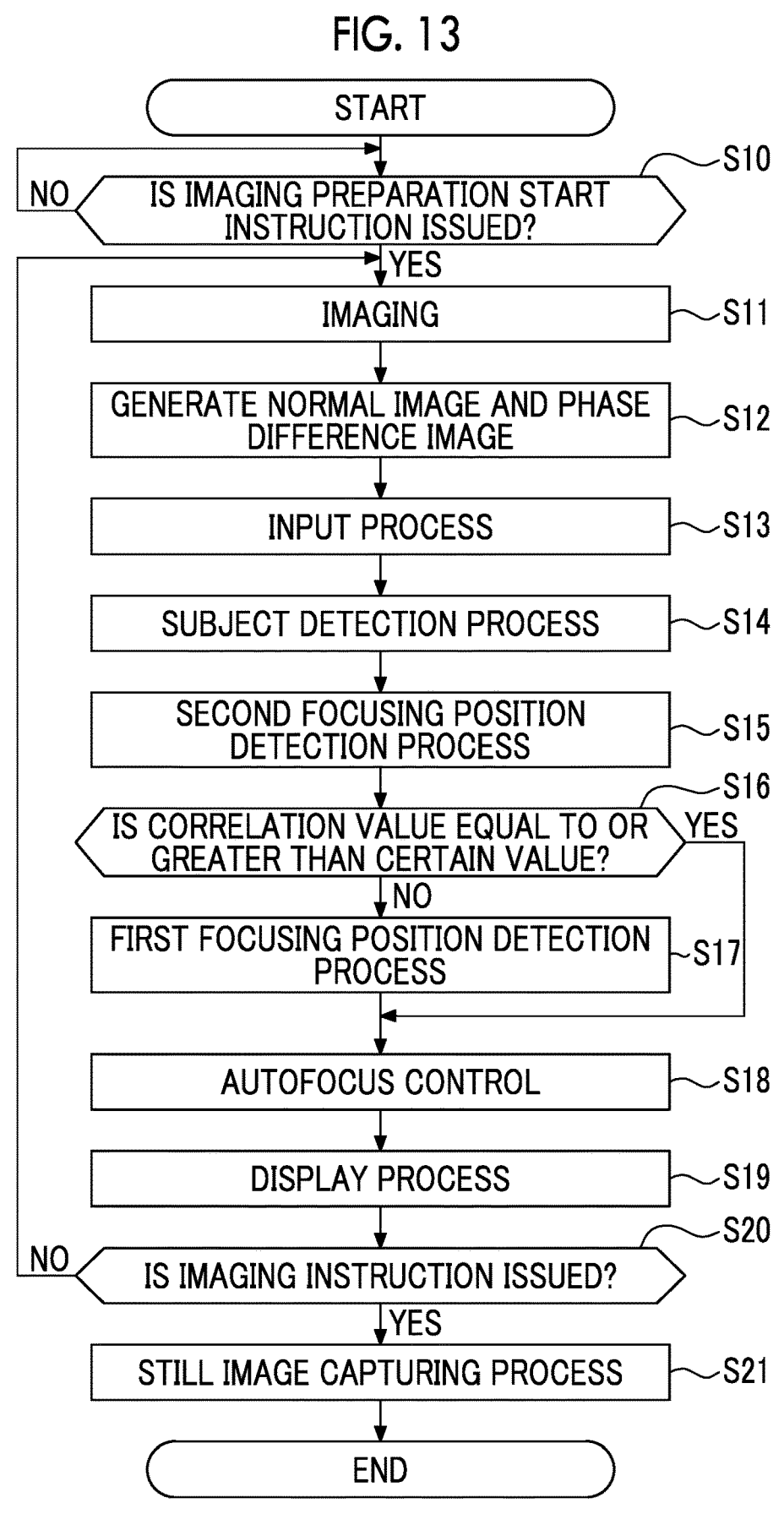

START

S10 — IS IMAGING PREPARATION START INSTRUCTION ISSUED? — NO

YES

S11 — IMAGING

S12 — GENERATE NORMAL IMAGE AND PHASE DIFFERENCE IMAGE

S13 — INPUT PROCESS

S14 — SUBJECT DETECTION PROCESS

S15 — SECOND FOCUSING POSITION DETECTION PROCESS

S16 — IS CORRELATION VALUE EQUAL TO OR GREATER THAN CERTAIN VALUE? — YES

NO

S17 — FIRST FOCUSING POSITION DETECTION PROCESS

S18 — AUTOFOCUS CONTROL

S19 — DISPLAY PROCESS

S20 — IS IMAGING INSTRUCTION ISSUED? — NO

YES

S21 — STILL IMAGE CAPTURING PROCESS

END

FIG. 15
LEARNING IMAGE       CORRECT ANSWER DATA
(RESULT OF CORRELATION
OPERATION)
PT
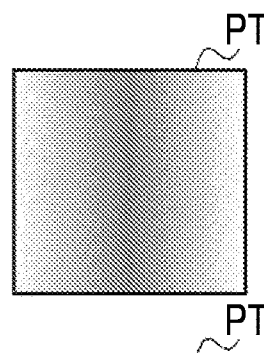
$\delta = 2.0$
PT
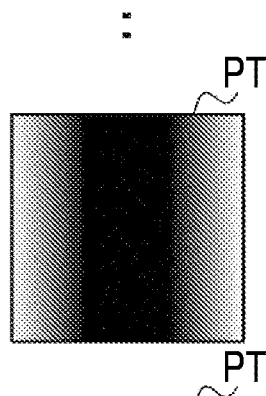
$\delta = 2.0$
...
PT
$\delta = 0.5$
PT
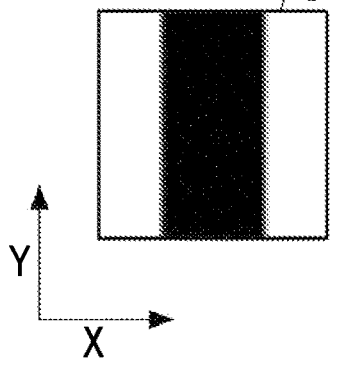
$\delta = 0.0$
Y
X

DETECTION METHOD, IMAGING APPARATUS, AND PROGRAM

CROSS-REFERENCE TO RELATED APPLICATION

This application is a continuation application of International Application No. PCT/JP2022/027947, filed Jul. 15, 2022, the disclosure of which is incorporated herein by reference in its entirety. Further, this application claims priority from Japanese Patent Application No. 2021-161788 filed on Sep. 30, 2021, the disclosure of which is incorporated herein by reference in its entirety.

BACKGROUND

1. Technical Field

The technology of the present disclosure relates to a detection method, an imaging apparatus, and a program.

2. Description of the Related Art

JP2020-198470A discloses an image recognition device having an imaging unit and a recognition unit. The imaging unit uses an imaging pixel that receives visible light and an imaging pixel that receives infrared light, and generates image data by capturing a plurality of images in a single frame period at the same exposure timing. The recognition unit recognizes a subject from each piece of the image data.

WO2019/073814A discloses a focus detection device comprising a calculation unit that outputs defocus amount relationship information related to a defocus amount by performing calculation based on learning, based on a received light amount distribution of an A pixel group having a first property for phase difference detection and a received light amount distribution of a B pixel group having a second property different from the first property.

SUMMARY

One embodiment according to the technology of the present disclosure provides a detection method, an imaging apparatus, and a program capable of enhancing detection accuracy of a subject and a focusing position.

In order to achieve the above-described object, according to the present disclosure, there is provided a detection method used in an imaging apparatus including an imaging element that has a first pixel for generating a first signal and second and third pixels for generating second and third signals for detecting a phase difference, and a memory that stores a model trained through machine learning, the detection method comprising: an input step of inputting a second image based on the second signal, a third image based on the third signal, or a fourth image based on the second signal and the third signal to the model as an input image; a subject detection step of detecting a subject included in a first image generated by the first signal, through the model on which the input step is executed; and a first focusing position detection step of detecting a focusing position with respect to the subject, through the model on which the input step is executed.

It is preferable that a second focusing position detection step of detecting the focusing position with respect to the subject by performing correlation operation using the second signal and the third signal is further provided.

It is preferable that the first focusing position detection step is executed according to a result of the second focusing position detection step or the subject detection step.

It is preferable that, in the input step, the input image is rotated and input to the model, and in the first focusing position detection step, the focusing position is detected based on the rotated input image.

It is preferable that a first readout step of reading out the first signal from the first pixel, and a second readout step of reading out the second signal and the third signal from the second pixel and the third pixel, independently of the first readout step, are further provided.

It is preferable that an exposure amount of the second pixel and the third pixel read out in the second readout step is different from an exposure amount of the first pixel read out in the first readout step.

It is preferable that a readout rate of the second signal and the third signal in the second readout step is higher than a readout rate of the first signal in the first readout step.

It is preferable that, in the input step, any of the second image or the third image is input to the model as the input image based on a position of the subject detected in the subject detection step in a past.

It is preferable that the input image in the input step is the fourth image.

It is preferable that, in a case where a phase difference detection direction of the second pixel and the third pixel is a horizontal direction, the model executes horizontal pooling and vertical pooling on the input image in the subject detection step, and executes horizontal pooling on the input image in the first focusing position detection step.

It is preferable that a plurality of the models are stored in the memory, a selection step of selecting one model suitable for a phase difference detection direction of the second pixel and the third pixel is further provided, and in the input step, the input image is input to the model selected in the selection step.

According to the present disclosure, there is provided an imaging apparatus comprising: an imaging element that has a first pixel for generating a first signal and second and third pixels for generating second and third signals for detecting a phase difference; a memory that stores a model trained through machine learning; and a processor, in which the processor is configured to execute: an input process of inputting a second image based on the second signal, a third image based on the third signal, or a fourth image based on the second signal and the third signal to the model as an input image; a subject detection process of detecting a subject included in a first image generated by the first signal, through the model on which the input process is executed; and a first focusing position detection process of detecting a focusing position with respect to the subject, through the model on which the input process is executed.

According to the present disclosure, there is provided a program for operating an imaging apparatus including an imaging element that has a first pixel for generating a first signal and second and third pixels for generating second and third signals for detecting a phase difference, and a memory that stores a model trained through machine learning, the program causing the imaging apparatus to execute: an input process of inputting a second image based on the second signal, a third image based on the third signal, or a fourth image based on the second signal and the third signal to the model as an input image; a subject detection process of detecting a subject included in a first image generated by the first signal, through the model on which the input process is executed; and a first focusing position detection process of detecting a focusing position with respect to the subject, through the model on which the input process is executed.

BRIEF DESCRIPTION OF THE DRAWINGS

Exemplary embodiments according to the technique of the present disclosure will be described in detail based on the following figures, wherein:

FIG. 13 is a flowchart showing an example of a procedure of a detection method, FIG. 15 is a diagram showing an example of training data.

DETAILED DESCRIPTION

An example of an embodiment according to the technology of the present disclosure will be described with reference to the accompanying drawings.

First, the terms to be used in the following description will be described.

In the following description, "IC" is an abbreviation for "integrated circuit". "CPU" is an abbreviation for "central processing unit". "ROM" is an abbreviation for "read only memory". "RAM" is an abbreviation for "random access memory". "CMOS" is an abbreviation for "complementary metal oxide semiconductor".

"FPGA" is an abbreviation for "field programmable gate array". "PLD" is an abbreviation for "programmable logic device". "ASIC" is an abbreviation for "application specific integrated circuit". "OVF" is an abbreviation for "optical view finder". "EVF" is an abbreviation for "electronic view finder". "JPEG" is an abbreviation for "joint photographic experts group". "CNN" is an abbreviation for "convolutional neural network". "GAP" is an abbreviation for "global average pooling".

As one embodiment of an imaging apparatus, the technology of the present disclosure will be described by using a lens-interchangeable digital camera as an example. It should be noted that the technology of the present disclosure is not limited to the lens-interchangeable type and can also be applied to a lens-integrated digital camera.

Figure 1:
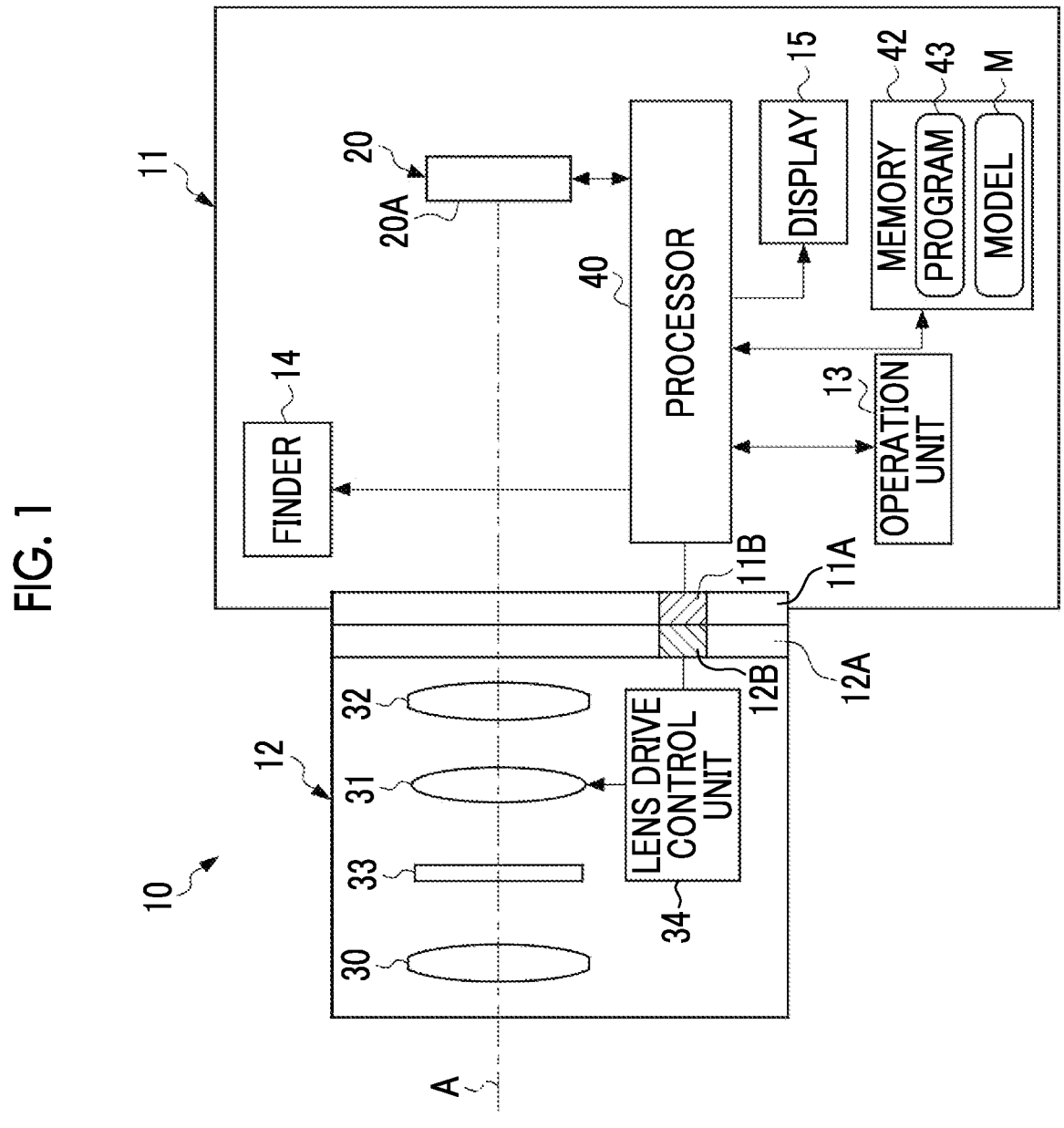
FIG. 1 is a diagram showing an example of an internal configuration of an imaging apparatus.

FIG. 1 shows an example of a configuration of an imaging apparatus 10. The imaging apparatus 10 is a lens-interchangeable digital camera. The imaging apparatus 10 is composed of a body 11 and an imaging lens 12 interchangeably mounted on the body 11. The imaging lens 12 is attached to a front surface side of the body 11 via a camera side mount 11A and a lens side mount 12A.

The body 11 is provided with an operation unit 13 including a dial, a release button, and the like. Examples of an operation mode of the imaging apparatus 10 include a still image capturing mode, a video capturing mode, and an image display mode. The operation unit 13 is operated by a user upon setting the operation mode. Additionally, the operation unit 13 is operated by the user upon starting the execution of still image capturing or video capturing.

Further, the body 11 is provided with a finder 14. Here, the finder 14 is a hybrid finder (registered trademark). The hybrid finder refers to, for example, a finder in which an optical view finder (hereinafter, referred to as "OVF") and an electronic view finder (hereinafter, referred to as "EVF") are selectively used. The user can observe an optical image or a live view image of a subject projected onto the finder 14 via a finder eyepiece portion (not shown).

Moreover, a display 15 is provided on a rear surface side of the body 11. The display 15 displays an image based on an image signal obtained through imaging, various menu screens, and the like. The user can also observe the live view image projected onto the display 15 instead of the finder 14.

The body 11 and the imaging lens 12 are electrically connected to each other through contact between an electrical contact 11B provided on the camera side mount 11A and an electrical contact 12B provided on the lens side mount 12A.

The imaging lens 12 includes an objective lens 30, a focus lens 31, a rear end lens 32, and a stop 33. Respective members are arranged in the order of the objective lens 30, the stop 33, the focus lens 31, and the rear end lens 32 from an objective side along an optical axis A of the imaging lens 12. The objective lens 30, the focus lens 31, and the rear end lens 32 constitute an imaging optical system. The type, number, and arrangement order of the lenses constituting the imaging optical system are not limited to the examples shown in FIG. 1.

In addition, the imaging lens 12 has a lens drive control unit 34. The lens drive control unit 34 includes, for example, a CPU, a RAM, a ROM, and the like. The lens drive control unit 34 is electrically connected to a processor 40 inside the body 11 via the electrical contact 12B and the electrical contact 11B.

The lens drive control unit 34 drives the focus lens 31 and the stop 33 based on a control signal transmitted from the processor 40. The lens drive control unit 34 performs the drive control of the focus lens 31 based on a control signal for focusing control transmitted from the processor 40, in order to adjust a focusing position of the imaging lens 12. The processor 40 performs focusing position detection using a phase difference method.

The stop 33 has an opening whose opening diameter is variable with the optical axis A as the center. The lens drive control unit 34 performs the drive control of the stop 33 based on a control signal for stop adjustment transmitted from the processor 40, in order to adjust an amount of light incident on a light-receiving surface 20A of an imaging sensor 20.

Further, the imaging sensor 20, the processor 40, and a memory 42 are provided inside the body 11. The operations of the imaging sensor 20, the memory 42, the operation unit 13, the finder 14, and the display 15 are controlled by the processor 40.

The processor 40 includes, for example, a CPU, a RAM, a ROM, and the like. In such a case, the processor 40 executes various types of processing based on a program 43 stored in the memory 42. The processor 40 may include an assembly of a plurality of IC chips. In addition, the memory 42 stores a model M that has been trained through machine learning for performing subject detection and focusing position detection.

The imaging sensor 20 is, for example, a CMOS type image sensor. The imaging sensor 20 is disposed such that the optical axis A is orthogonal to the light-receiving surface 20A and the optical axis A is located at the center of the light-receiving surface 20A. Light (subject image) that has passed through the imaging lens 12 is incident on the light-receiving surface 20A. A plurality of pixels for generating signals through photoelectric conversion are formed on the light-receiving surface 20A. The imaging sensor 20 generates and outputs the signal by photoelectrically converting the light incident on each pixel. The imaging sensor 20 is an example of an "imaging element" according to the technology of the present disclosure.

Further, a Bayer array color filter array is disposed on the light-receiving surface of the imaging sensor 20, and any of a red (R), green (G), or blue (B) color filter is disposed to face each pixel. Some of the plurality of pixels arranged on the light-receiving surface of the imaging sensor 20 may be phase difference pixels for detecting a phase difference related to focusing control.

Figure 2:
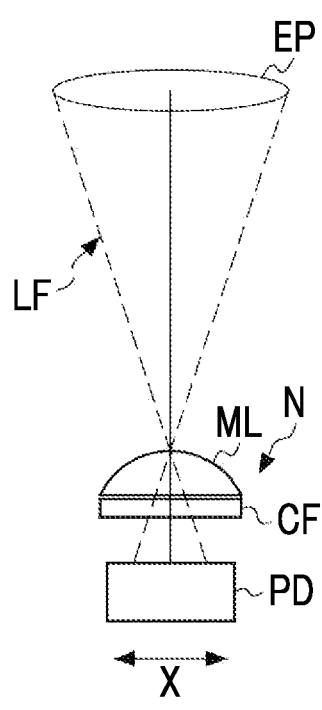
FIG. 2 is a diagram showing an example of a configuration of an imaging pixel.
Figure 3:
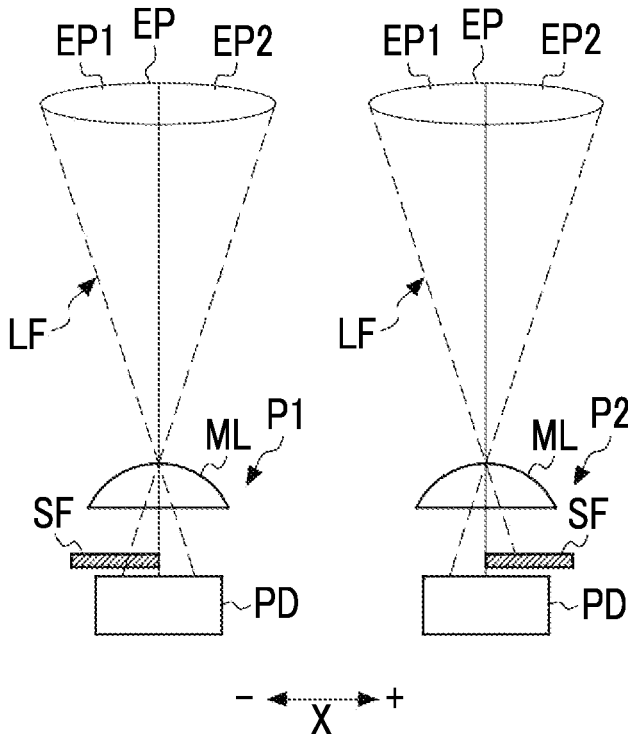
FIG. 3 is a diagram showing an example of a configuration of a phase difference pixel.

FIG. 2 shows an example of a configuration of an imaging pixel N. FIG. 3 shows an example of configurations of phase difference pixels P1 and P2. The phase difference pixels P1 and P2 each receive one of rays of luminous flux split in an X direction with a main light ray as the center. Hereinafter, a direction orthogonal to the X direction will be referred to as a Y direction. In addition, the X direction corresponds to a horizontal direction, and the Y direction corresponds to a vertical direction.

As shown in FIG. 2, the imaging pixel N includes a photodiode PD serving as a photoelectric conversion element, a color filter CF, and a microlens ML. The color filter CF is disposed between the photodiode PD and the microlens ML.

The color filter CF is a filter that transmits light of any of R, G, or B. The microlens ML converges a luminous flux LF incident from an exit pupil EP of the imaging lens 12 to substantially the center of the photodiode PD via the color filter CF.

As shown in FIG. 3, the phase difference pixels P1 and P2 each include the photodiode PD, a light shielding layer SF, and the microlens ML. The microlens ML converges, similarly to the imaging pixel N, the luminous flux LF incident from the exit pupil EP of the imaging lens 12 to substantially the center of the photodiode PD. The imaging pixel N is an example of a "first pixel" according to the technology of the present disclosure.

The light shielding layer SF is formed of a metal film or the like and is disposed between the photodiode PD and the microlens ML. The light shielding layer SF blocks a part of the luminous flux LF incident on the photodiode PD via the microlens ML.

In the phase difference pixel P1, the light shielding layer SF blocks light on a negative side in the X direction with the center of the photodiode PD as a reference. That is, in the phase difference pixel P1, the light shielding layer SF makes the luminous flux LF from a negative side exit pupil EP1 incident on the photodiode PD and blocks the luminous flux LF from a positive side exit pupil EP2 in the X direction.

In the phase difference pixel P2, the light shielding layer SF blocks light on a positive side in the X direction with the center of the photodiode PD as a reference. That is, in the phase difference pixel P2, the light shielding layer SF makes the luminous flux LF from the positive side exit pupil EP2 incident on the photodiode PD and blocks the luminous flux LF from the negative side exit pupil EP1 in the X direction.

That is, the phase difference pixel P1 and the phase difference pixel P2 have mutually different light shielding positions in the X direction. A phase difference detection direction of the phase difference pixels P1 and P2 is the X direction (that is, the horizontal direction). The phase difference pixel P1 is an example of a "second pixel" according to the technology of the present disclosure. Additionally, the phase difference pixel P2 is an example of a "third pixel" according to the technology of the present disclosure.

Figure 4:
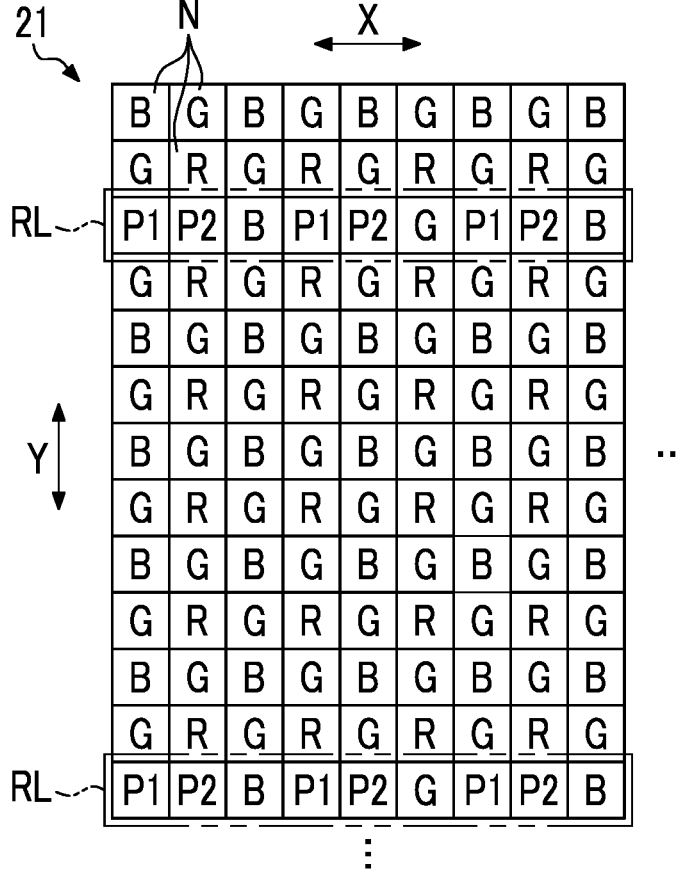
FIG. 4 is a diagram showing an example of pixel arrangement of an imaging sensor.

FIG. 4 shows an example of pixel arrangement of the imaging sensor 20. "R" in FIG. 4 indicates the imaging pixel N provided with the color filter CF of R. "G" indicates the imaging pixel N provided with the color filter CF of G. "B" indicates the imaging pixel N provided with the color filter CF of B. The color arrangement of the color filter CF is not limited to the Bayer array and may be another color arrangement.

Rows RL including the phase difference pixels P1 and P2 are arranged every 10 pixels in the Y direction. In each row RL, a pair of phase difference pixels P1 and P2 and one imaging pixel N are repeatedly arranged in the X direction. An arrangement pattern of the phase difference pixels P1 and P2 is not limited to the example shown in FIG. 4. For example, a pattern in which a plurality of phase difference pixels are disposed in one microlens ML as shown in FIG. 5 attached to JP2018-56703A may be used.

Figure 5:
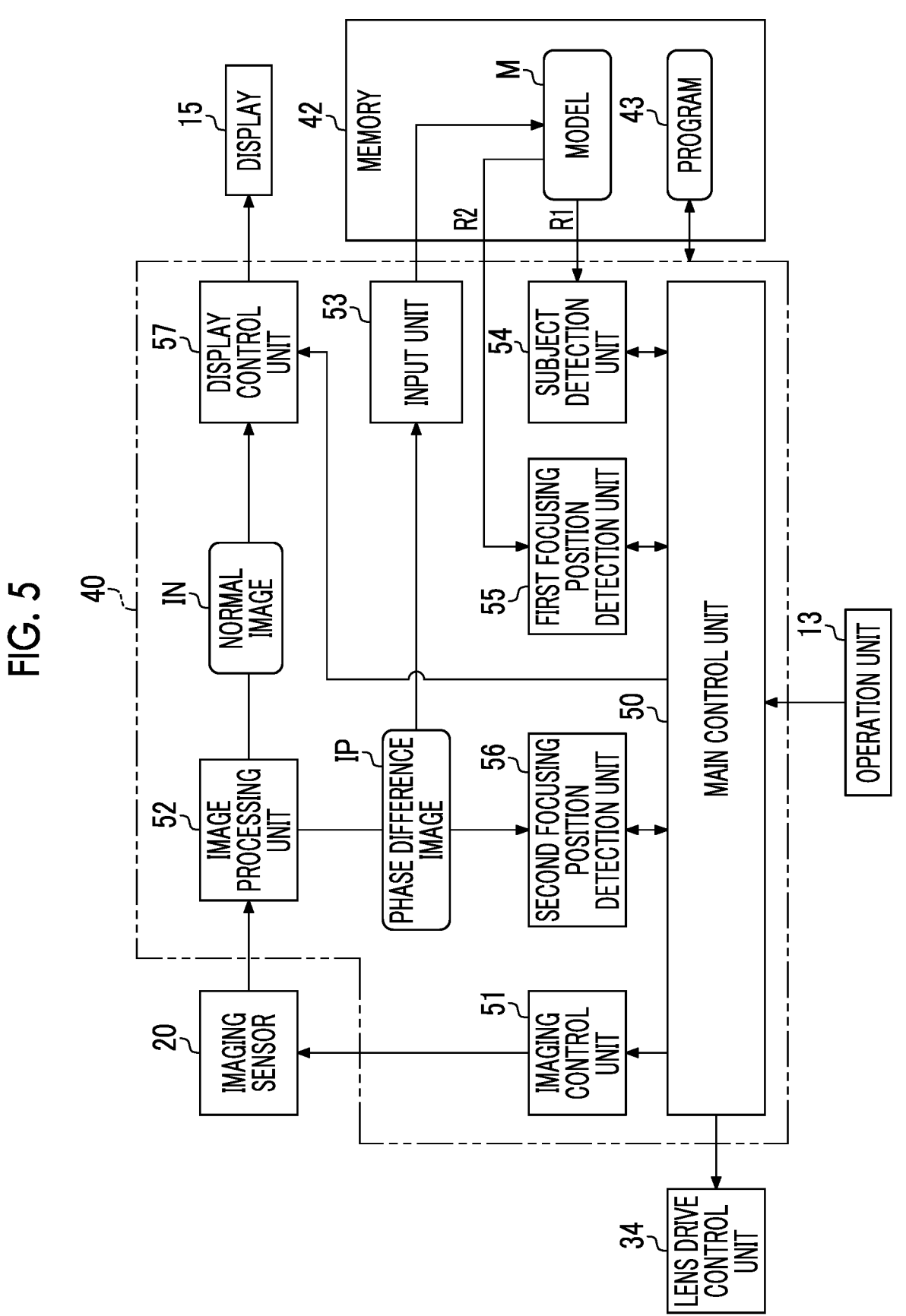
FIG. 5 is a block diagram showing an example of a functional configuration of a processor.

FIG. 5 shows an example of a functional configuration of the processor 40. The processor 40 implements various functional units by executing processing in accordance with the program 43 stored in the memory 42. As shown in FIG. 5, for example, a main control unit 50, an imaging control unit 51, an image processing unit 52, an input unit 53, a subject detection unit 54, a first focusing position detection unit 55, a second focusing position detection unit 56, and a display control unit 57 are implemented by the processor 40.

The main control unit 50 comprehensively controls the operations of the imaging apparatus 10 based on instruction signals input through the operation unit 13. The imaging control unit 51 executes an imaging process of causing the imaging sensor 20 to perform an imaging operation by controlling the imaging sensor 20. The imaging control unit 51 drives the imaging sensor 20 in the still image capturing mode or the video capturing mode.

Figure 6:
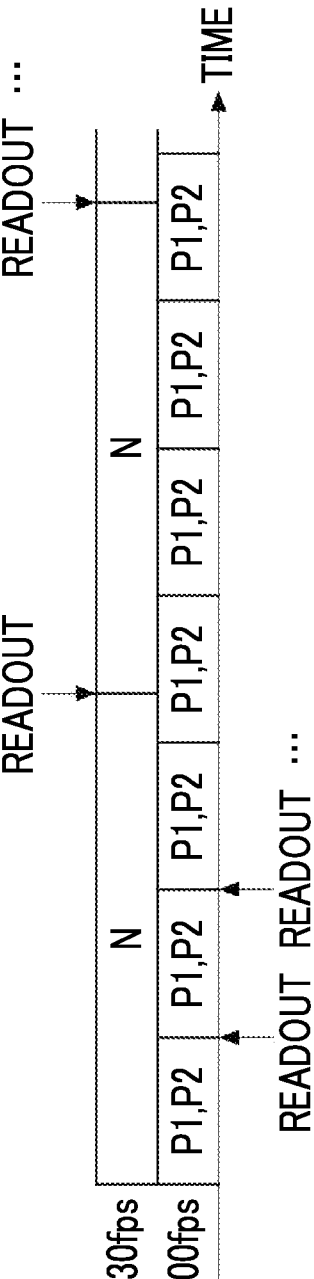
FIG. 6 is a diagram illustrating a first readout step and a second readout step.

As shown in FIG. 6, the imaging control unit 51 reads out the imaging pixel N and the phase difference pixels P1 and P2, which are included in the imaging sensor 20, at different readout rates from each other. In the present embodiment, the readout rate of the phase difference pixels P1 and P2 is higher than the readout rate of the imaging pixel N. For example, the imaging control unit 51 reads out the imaging pixel N at 30 fps and reads out the phase difference pixels P1 and P2 at 100 fps.

The imaging sensor 20 individually outputs the signal generated by the imaging pixel N and the signal generated by the phase difference pixels P1 and P2, respectively. That is, a first readout process of reading out the signal from the imaging pixel N and a second readout process of reading out the signal from the phase difference pixels P1 and P2 are performed independently. The imaging control unit 51 may simultaneously execute the first readout process and the second readout process. The first readout process corresponds to a "first readout step" according to the technology of the present disclosure. The second readout process corresponds to a "second readout step" according to the technology of the present disclosure.

In addition, since the exposure times of the imaging pixel N and the phase difference pixels P1 and P2 are different from each other, the exposure amount of the phase difference pixels P1 and P2 and the exposure amount of the imaging pixel N are different from each other.

The signal generated by the imaging pixel N is an example of a "first signal" according to the technology of the present disclosure. The signal generated by the phase difference pixel P1 is an example of a "second signal" according to the technology of the present disclosure. The signal generated by the phase difference pixel P2 is an example of a "third signal" according to the technology of the present disclosure.

The image processing unit 52 acquires the signal output from the imaging sensor 20 and performs image processing on the acquired signal. Specifically, the image processing unit 52 generates a normal image IN by performing a demosaicing process or the like on the signal generated by the imaging pixel N. In addition, a phase difference image IP is generated based on the signals generated by the phase difference pixels P1 and P2.

Figure 7:
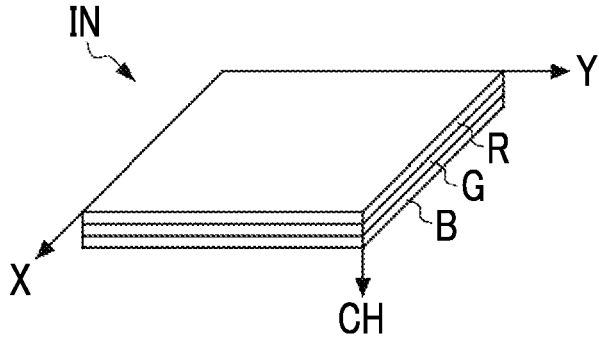
FIG. 7 is a diagram showing a configuration of the imaging pixel.

For example, as shown in FIG. 7, the normal image IN is a color image in which each pixel is represented by three primary colors (that is, three channels), R, G, and B. More specifically, for example, the imaging pixel N is a 24-bit color image in which each signal of R, G, and B included in one pixel is represented by 8 bits.

Figure 8:
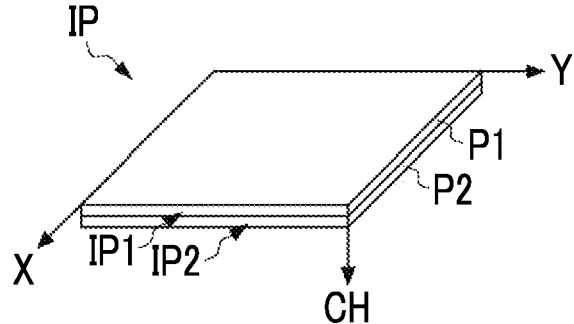
FIG. 8 is a diagram showing a configuration of a phase difference image.

In addition, as shown in FIG. 8, the phase difference image IP is an image including an image IP1 based on the phase difference pixel P1 and an image IP2 based on the phase difference pixel P2. The image IP1 and the image IP2 are achromatic images and are, for example, 24-bit grayscale images in which each signal is represented by 8 bits. The phase difference image IP can also be regarded as one image in which each pixel has phase difference information of two channels of left and right. The image IP1 is an example of a "second image based on the second signal" according to the technology of the present disclosure. The image IP2 is an example of a "third image based on the third signal" according to the technology of the present disclosure. The phase difference image IP is an example of a "fourth image based on the second signal and the third signal" according to the technology of the present disclosure.

The normal image IN generated by the image processing unit 52 is input to the display control unit 57. The phase difference image IP generated by the image processing unit 52 is input to the input unit 53 and the second focusing position detection unit 56.

The input unit 53 performs an input process of inputting the phase difference image IP input from the image processing unit 52 to the model M stored in the memory 42, as an input image. Specifically, the input unit 53 inputs the phase difference image IP, the image IP1, or the image IP2 to the model M as the input image. In the present embodiment, the input unit 53 inputs the phase difference image IP to the model M as the input image.

Although details will be described below, the model M outputs an inference result R1 related to the subject and an inference result R2 related to the focusing position based on the input image. The inference result R1 is information indicating the position and the type of each subject included in the normal image IN. The inference result R2 is information indicating a focusing position (that is, a defocus amount) of each region within the normal image IN.

The subject detection unit 54 performs a subject detection process of detecting a specific subject included in the normal image IN based on the inference result R1 output from the model M.

The first focusing position detection unit 55 performs a first focusing position detection process of detecting the focusing position with respect to the specific subject included in the normal image IN based on the inference result R2 output from the model M. The focusing position refers to a position of the focus lens 31 in a case where the subject is in an in-focus state.

The second focusing position detection unit 56 detects the focusing position with respect to the specific subject included in the normal image IN by performing correlation operation using the image IP1 and the image IP2 included in the phase difference image IP input from the image processing unit 52.

The display control unit 57 displays the normal image IN input from the image processing unit 52 on the display 15. In addition, the display control unit 57 causes the display 15 to perform live view image display based on the normal image IN that is periodically input from the image processing unit 52 during an imaging preparation operation before the still image capturing or the video capturing. Further, the display control unit 57 causes the display 15 to display the subject that is in the in-focus state in an identifiable manner based on a detection result of the subject detected by the subject detection unit 54 and a detection result of the focusing position detected by the first focusing position detection unit 55 or the second focusing position detection unit 56.

Figure 9:
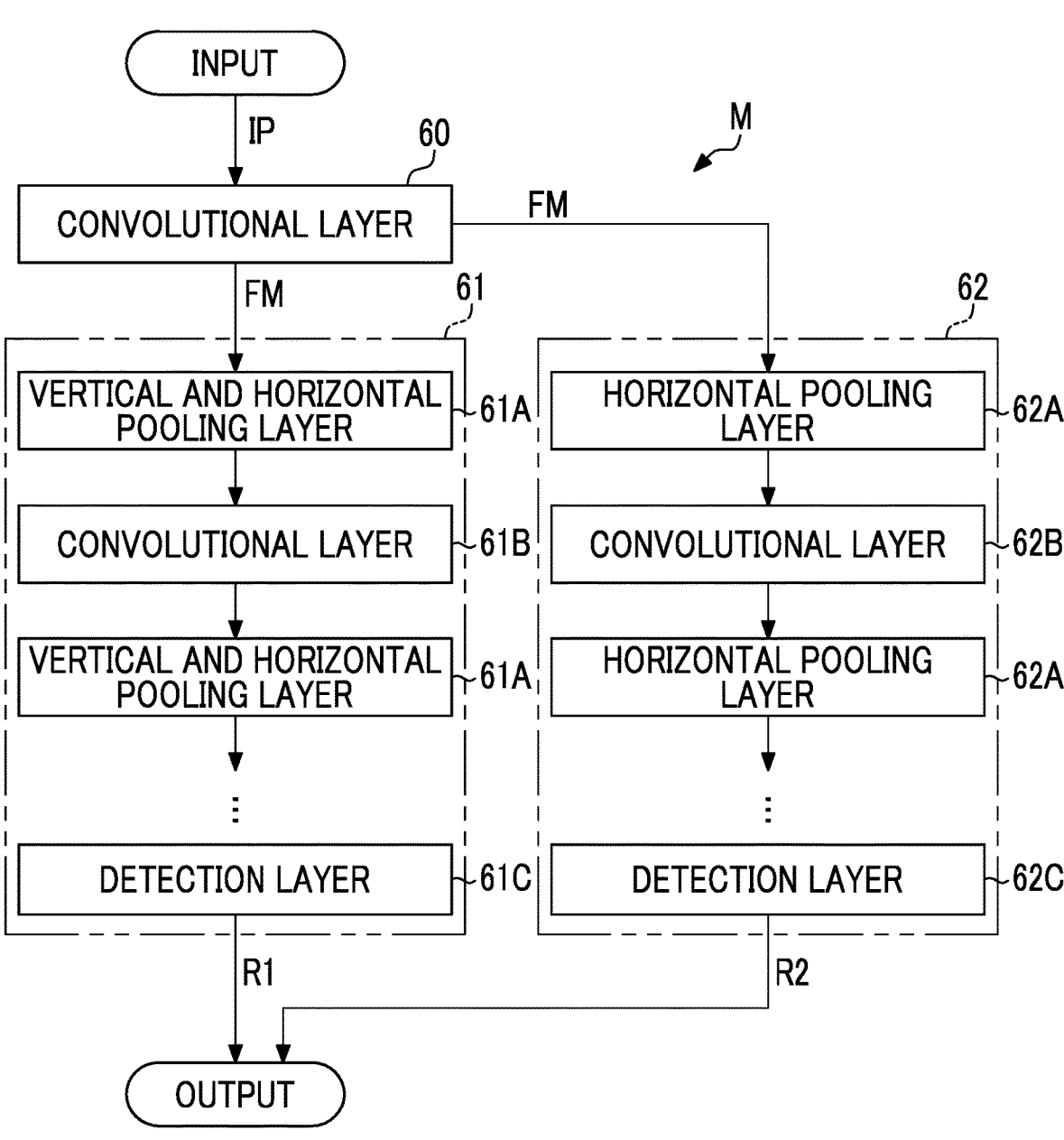
FIG. 9 is a diagram showing an example of a configuration of a model.

FIG. 9 shows an example of a configuration of the model M. The model M is configured with a convolutional neural network (CNN). Specifically, the model M is a two-stream CNN having a convolutional layer 60, a first subnetwork 61, and a second subnetwork 62. The first subnetwork 61 is a CNN that performs inference regarding the subject appearing in the input image. The second subnetwork 62 is a CNN that performs inference regarding the focusing position.

The input image is input to the convolutional layer 60 from the input unit 53. In the present embodiment, the phase difference image IP is input to the convolutional layer 60 as the input image from the input unit 53. The convolutional layer 60 generates a feature map FM by performing a filtering process on the input image and inputs the generated feature map FM to the first subnetwork 61 and the second subnetwork 62.

The first subnetwork 61 includes a plurality of vertical and horizontal pooling layers 61A, a plurality of convolutional layers 61B, and a detection layer 61C. The vertical and horizontal pooling layer 61A and the convolutional layer 61B are alternately disposed.

The vertical and horizontal pooling layer 61A performs vertical and horizontal pooling on the feature map FM input from the convolutional layer 60. The vertical and horizontal pooling is symmetric pooling that is symmetrical in the vertical direction (Y direction) and the horizontal direction (X direction). That is, the vertical and horizontal pooling layer 61A performs the vertical and horizontal pooling on the feature map FM, which corresponds to executing the horizontal pooling and the vertical pooling on the feature map FM. The vertical and horizontal pooling layer 61A performs vertical and horizontal pooling on the feature map FM, whereby the resolution is reduced in the vertical direction and the horizontal direction.

Figure 10A:
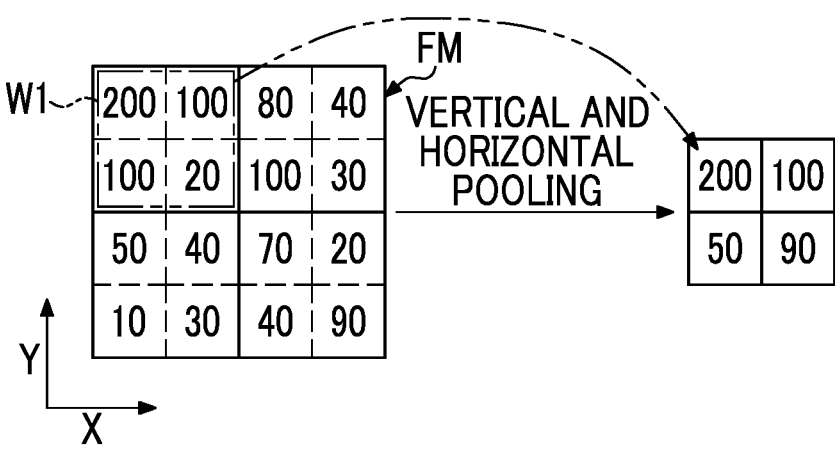
FIGS. 10A and 10B are diagrams illustrating a pooling process.

As shown in FIG. 10A as an example, the vertical and horizontal pooling layer 61A performs processing of taking a maximum value with respect to a region surrounded by a 2×2 square pooling window W1 in the feature map FM. The vertical and horizontal pooling layer 61A may perform processing of taking an average value with respect to the region surrounded by the pooling window W1.

The convolutional layer 61B performs a filtering process on the feature map FM in which the resolution is reduced in the vertical direction and the horizontal direction by the vertical and horizontal pooling layer 61A.

In the first subnetwork 61, the vertical and horizontal pooling layer 61A and the convolutional layer 61B alternately execute the processing on the feature map FM, whereby a high-dimensional feature amount is extracted as image information.

The detection layer 61C performs inference and classification of the position of the subject based on the image information extracted by a plurality of sets of the vertical and horizontal pooling layers 61A and the convolutional layers 61B. The detection layer 61C outputs the inference result R1.

The second subnetwork 62 includes a plurality of horizontal pooling layers 62A, a plurality of convolutional layers 62B, and a detection layer 62C. The horizontal pooling layer 62A and the convolutional layer 62B are alternately disposed.

The horizontal pooling layer 62A performs horizontal pooling on the feature map FM input from the convolutional layer 60. The horizontal pooling is asymmetric pooling in which processing is performed only in the horizontal direction (X direction), which is the phase difference detection direction of the phase difference pixels P1 and P2. The horizontal pooling layer 62A performs horizontal pooling on the feature map FM, whereby the resolution is reduced only in the horizontal direction.

Figure 10B:
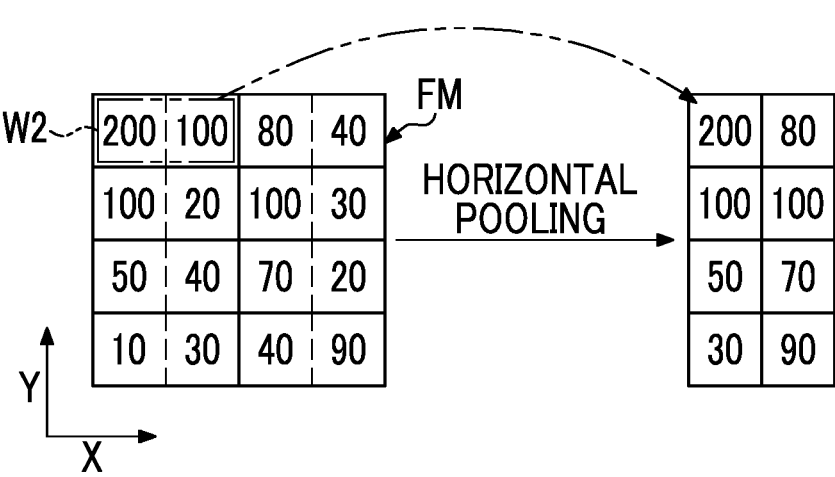

As shown in FIG. 10B as an example, the horizontal pooling layer 62A performs processing of taking a maximum value with respect to a region surrounded by a 1×2 rectangular pooling window W2 long in the horizontal direction in the feature map FM. The horizontal pooling layer 62A may perform processing of taking an average value with respect to the region surrounded by the pooling window W2.

The convolutional layer 62B performs a filtering process on the feature map FM in which the resolution is reduced in the horizontal direction by the horizontal pooling layer 62A.

In the second subnetwork 62, the horizontal pooling layer 62A and the convolutional layer 62B alternately execute the processing on the feature map FM, whereby the high-dimensional feature amount is extracted as focusing information.

The detection layer 62C performs inference (detection) of the focusing position based on the focusing information extracted by a plurality of sets of the horizontal pooling layers 62A and the convolutional layers 62B. The detection layer 62C outputs the inference result R2.

Figure 11:
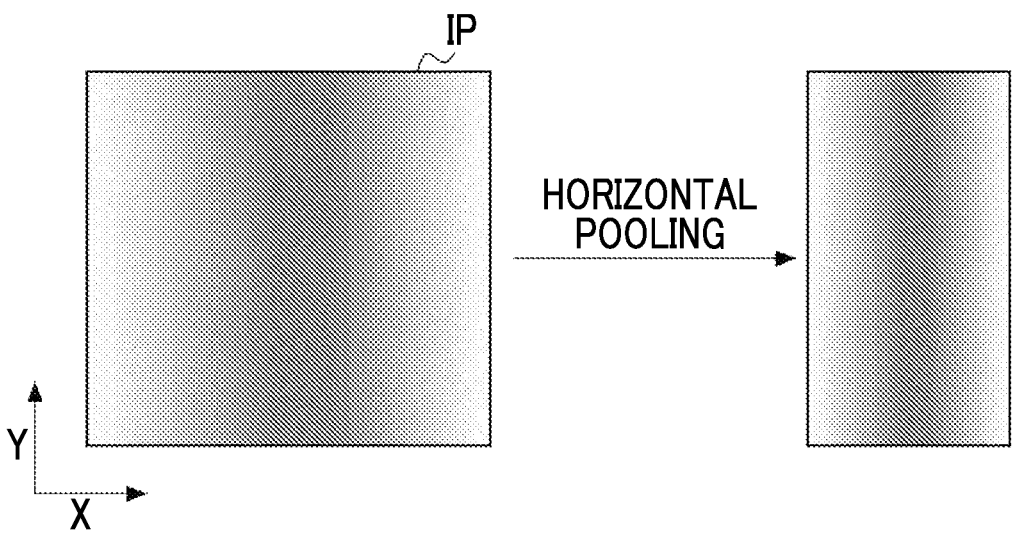
FIG. 11 is a diagram showing an example of a change in resolution of the phase difference image due to horizontal pooling.

FIG. 11 shows an example of a change in resolution of the phase difference image IP due to horizontal pooling. As shown in FIG. 11, the phase difference image IP is converted into the feature map FM by the convolutional layer 60, and then, the horizontal pooling is performed by the horizontal pooling layer 62A, so that the resolution in the horizontal direction decreases compared to the resolution in the vertical direction.

As described above, the phase difference detection direction of the phase difference pixels P1 and P2 of the imaging sensor 20 is the horizontal direction. Therefore, as shown in FIG. 11, as the difference in brightness in the horizontal direction in the phase difference image IP is clearer, the detection accuracy of the focusing position is improved. Therefore, in the second subnetwork 62, the feature in the horizontal direction is emphasized by performing the horizontal pooling on the phase difference image IP, so that the inference accuracy related to the focusing position is improved.

Figure 12:
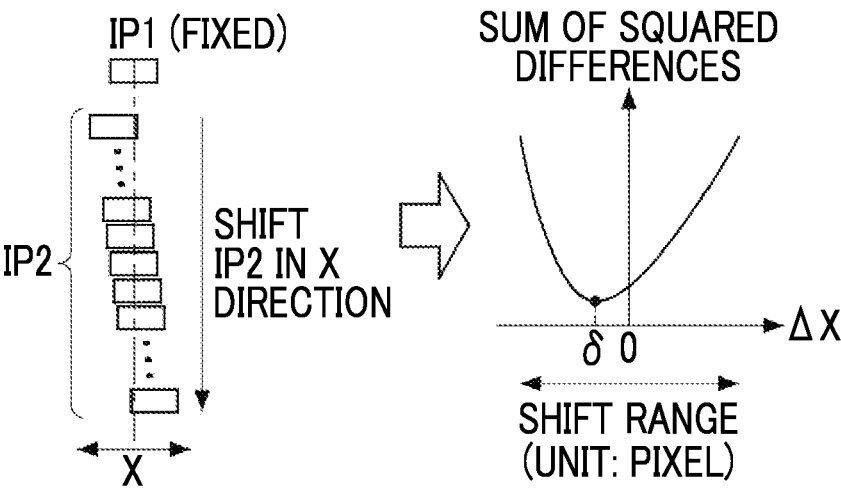
FIG. 12 is a diagram showing an example of a second focusing position detection process.

FIG. 12 shows an example of the second focusing position detection process by the second focusing position detection unit 56. The correlation operation is performed using the image IP1 and the image IP2 included in the phase difference image IP input from the image processing unit 52. For example, the second focusing position detection unit 56 performs the correlation operation by using the image IP1 and the image IP2 included in a designated region designated from within an imaging area in response to the operation of the operation unit 13 by the user. The second focusing position detection unit 56 may perform the correlation operation by using the image IP1 and the image IP2 of a region corresponding to the specific subject detected by the subject detection unit 54.

Specifically, the second focusing position detection unit 56 calculates the sum of squared differences by fixing the image IP1 and performing the correlation operation between the image IP1 and the image IP2 while shifting the image IP2 pixel by pixel in the horizontal direction (X direction). Each time the image IP2 is shifted by one pixel, one sum of squared differences is calculated.

In FIG. 12, $\Delta X$ represents a shift amount of the image IP2 in the X direction. The second focusing position detection unit 56 acquires a shift amount $\delta$ at which the sum of squared differences is minimized in a shift range (a range from a minimum value to a maximum value of a shift amount $\Delta X$), as the focusing information. The shift amount $\delta$ indicates the focusing position (that is, a defocus amount).

The main control unit 50 moves the focus lens 31 to the focusing position detected by the first focusing position detection unit 55 or the second focusing position detection unit 56, in a case of performing autofocus control. Basically, since the detection accuracy by the second focusing position detection unit 56 based on the correlation operation is higher than the detection accuracy by the first focusing position detection unit 55, the main control unit 50 generally performs the autofocus control based on the detection result by the second focusing position detection unit 56.

Meanwhile, the detection of the focusing position by the second focusing position detection unit 56 based on the correlation operation has low detection accuracy for an image having a pattern consisting of lines in the horizontal direction, an image having a checker pattern, an image having a large number of high-frequency components with a fine pattern, and the like. Therefore, in a case where a correlation value obtained through the correlation operation by the second focusing position detection unit 56 is low (that is, the reliability degree of the detection result is low), the main control unit 50 performs the autofocus control based on the detection result by the first focusing position detection unit 55 using the model M. The correlation value is, for example, the minimum value of the sum of squared differences.

FIG. 13 is a flowchart showing an example of a procedure of a detection method executed by the imaging apparatus 10. FIG. 13 shows an example of a case where the live view image display is performed during the imaging preparation operation in the still image capturing mode.

The main control unit 50 determines whether or not an imaging preparation start instruction is issued by the user through the operation of the operation unit 13 (step S10). The main control unit 50 controls the imaging control unit 51 to cause the imaging sensor 20 to perform the imaging operation (step S11), in a case where the imaging preparation start instruction is issued (step S10: YES). In step S11, the imaging control unit 51 executes the first readout process of reading out the signal from the imaging pixel N and the second readout process of reading out the signal from the phase difference pixels P1 and P2. In the present example, for the sake of simplification of description, it is assumed that the first readout process and the second readout process are simultaneously executed.

The image processing unit 52 generates the normal image IN based on the signal generated by the imaging pixel N and generates the phase difference image IP based on the signal generated by the phase difference pixels P1 and P2 (step S12). The input unit 53 executes the input process of inputting the phase difference image IP to the model M as the input image (step S13).

The subject detection unit 54 performs the subject detection process of detecting a specific subject included in the normal image IN through the model M on which the input process is executed (step S14).

The second focusing position detection unit 56 performs the second focusing position detection process of detecting the focusing position with respect to the specific subject included in the normal image IN by performing the correlation operation using the image IP1 and the image IP2 included in the phase difference image IP (step S15).

The main control unit 50 determines whether or not the correlation value obtained by the correlation operation in the second focusing position detection process is equal to or greater than a certain value (step S16). The main control unit 50 transitions the process to step S18 in a case where the correlation value is equal to or greater than the certain value (step S16: YES). On the other hand, the main control unit 50 causes the first focusing position detection unit 55 to execute the first focusing position detection process (step S17) in a case where the correlation value is not equal to or greater than the certain value (step S16: NO). In step S17, the first focusing position detection unit 55 detects the focusing position with respect to the specific subject included in the normal image IN through the model M on which the input process is executed.

In step S18, the main control unit 50 performs the autofocus control based on the detection result by the second focusing position detection process in a case where the correlation value is equal to or greater than the certain value. On the other hand, the main control unit 50 performs the autofocus control based on the detection result by the first focusing position detection process in a case where the correlation value is not equal to or greater than the certain value.

The display control unit 57 displays the subject that is in the in-focus state on the display 15 in an identifiable manner based on the detection results of the subject and the focusing position, together with the normal image IN (step S19).

The main control unit 50 determines whether or not an imaging instruction is issued by the user through the operation of the operation unit 13 (step S20). The main control unit 50 returns the process to step S11 in a case where an operation instruction is not issued (step S20: NO). The processing of steps S11 to S19 is repeatedly executed until the main control unit 50 determines that the imaging instruction is issued in step S20.

In a case where the imaging instruction is issued (step S20: YES), the main control unit 50 causes the imaging sensor 20 to perform the imaging operation and performs a still image capturing process of recording the normal image IN generated by the image processing unit 52 in the memory 42 as a still image (step S21).

In the above-described flowchart, step S13 corresponds to an "input step" according to the technology of the present disclosure. Step S14 corresponds to a "subject detection step" according to the technology of the present disclosure. Step S15 corresponds to a "second focusing position detection step" according to the technology of the present disclosure. Step S17 corresponds to a "first focusing position detection step" according to the technology of the present disclosure.

According to the technology of the present disclosure, since the subject and the focusing position are detected using the model M based on the phase difference image IP, the detection accuracy of the subject and the focusing position can be enhanced regardless of the exposure state, the blur amount, and the like of the normal image IN.

For example, in a case where imaging is performed with underexposure or in a case where imaging is performed with a low shutter speed, it is difficult to accurately detect the subject because blurring is likely to occur on the subject. Even in such a case, according to the technology of the present disclosure, the imaging pixel N and the phase difference pixels P1 and P2 are read out at different readout rates, and the readout rate of the phase difference pixels P1 and P2 is set to be higher than the readout rate of the imaging pixel N, so that it is possible to generate the phase difference image IP with less blur. By detecting the subject and the focusing position using the phase difference image IP with less blur, the detection accuracy is improved.

As described above, according to the technology of the present disclosure, the detection accuracy of the subject and the focusing position is improved, so that it is possible to implement a subject tracking function with high accuracy. As a result, it is possible to perform a control such as setting a subject that is in the in-focus state as a tracking target and not setting a subject that is not in the in-focus state as the tracking target.

In addition, according to the technology of the present disclosure, the subject and the focusing position are detected by using the phase difference image IP, so that it is possible to accurately discern whether or not the subject is in the in-focus state, and it is possible to accurately detect the subject that is in the in-focus state.

Further, by detecting the focusing position by using the model M, the focusing position may be accurately detected in a situation where the detection accuracy of the focusing position based on the correlation operation is low.

[Modification Example]

Hereinafter, various modification examples of the above-described embodiment will be described.

In the above-described embodiment, the main control unit 50 executes the first focusing position detection process according to the result of the second focusing position detection process, but may execute the first focusing position detection process according to the result of the subject detection process. The main control unit 50 executes the first focusing position detection process in a case where the subject has a feature that the detection accuracy of the focusing position based on the correlation operation decreases as a result of the subject detection process. For example, in a case where the subject includes an image having a pattern consisting of lines in the horizontal direction or a checker pattern, the first focusing position detection process is executed. Specifically, in a case where the main control unit 50 recognizes that the subject is an image having the pattern consisting of lines in the horizontal direction or the checker pattern, the main control unit 50 executes the first focusing position detection process.

In addition, in the above-described embodiment, the input unit 53 inputs the entire phase difference image IP generated by the image processing unit 52 to the model M as the input image, but a part of the image cut out from the phase difference image IP may be input to the model M as the input image. A size of the input image can be changed according to the purpose. For example, it is preferable to change the size of the input image in a case of performing the subject tracking, and it is preferable not to change the size of the input image in a case of performing the image recognition.

Further, in the above-described embodiment, the model M is configured to individually output the inference result R1 related to the subject and the inference result R2 related to the focusing position, respectively, but may be configured to output one inference result related to the subject and the focusing position.

Figure 14:
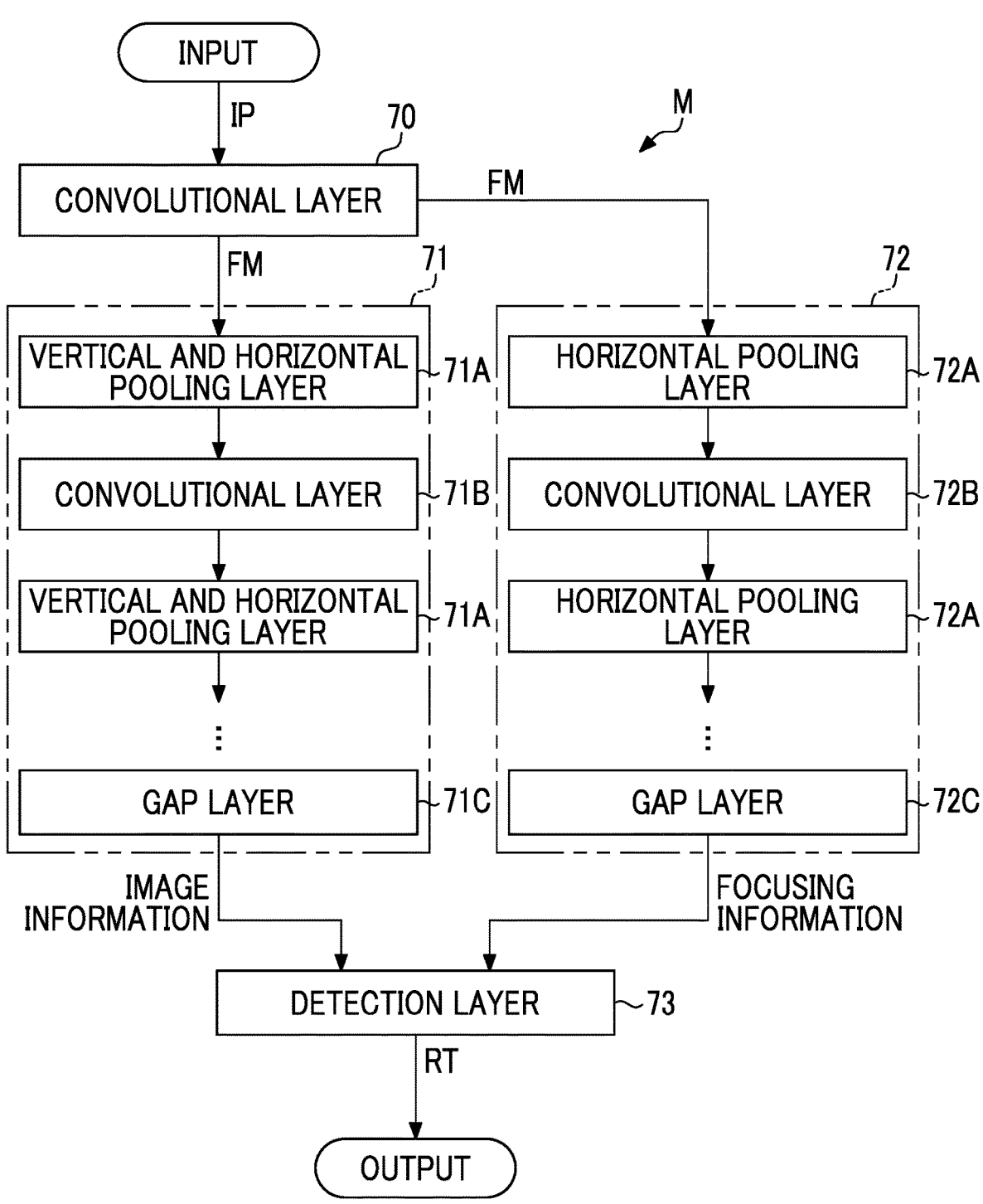
FIG. 14 is a diagram showing a modification example of the configuration of the model.

FIG. 14 shows an example of a configuration of the model M configured to output one inference result related to the subject and the focusing position. The model M shown in FIG. 14 has a convolutional layer 70, a first subnetwork 71, a second subnetwork 72, and a detection layer 73.

The convolutional layer 70 has the same configuration as the convolutional layer 60 of the above-described embodiment and receives an input of the input image from the input unit 53. The convolutional layer 70 generates the feature map FM and inputs the feature map FM to the first subnetwork 71 and the second subnetwork 72.

The first subnetwork 71 includes a plurality of vertical and horizontal pooling layers 71A, a plurality of convolutional layers 71B, and a GAP layer 71C. The vertical and horizontal pooling layer 71A and the convolutional layer 71B are alternately disposed. The vertical and horizontal pooling layer 71A and the convolutional layer 71B have the same configurations as the vertical and horizontal pooling layer 61A and the convolutional layer 61B of the above-described embodiment. The GAP layer 71C averages and outputs the image information extracted by a plurality of sets of the vertical and horizontal pooling layers 71A and the convolutional layers 71B.

The second subnetwork 72 includes a plurality of horizontal pooling layers 72A, a plurality of convolutional layers 72B, and a GAP layer 72C. The horizontal pooling layer 72A and the convolutional layer 72B are alternately disposed. The horizontal pooling layer 72A and the convolutional layer 72B have the same configurations as the horizontal pooling layer 62A and the convolutional layer 62B of the above-described embodiment. The GAP layer 72C averages and outputs the focusing information extracted by a plurality of sets of the horizontal pooling layers 72A and the convolutional layers 72B.

The image information output from the first subnetwork 71 and the focusing information output from the second subnetwork 72 are combined and input to the detection layer 73. The detection layer 73 infers (detects) the position of the subject that is in the in-focus state, for example, based on the image information and the focusing information, which are combined. The detection layer 73 outputs an inference result RT.

In this way, by configuring the model M to perform inference by combining the image information with the focusing information, it is possible to detect only the subject that is in the in-focus state.

In addition, in the above-described embodiment, the input unit 53 inputs the phase difference image IP to the model M as the input image, but any one of the image IP1 or the image IP2 included in the phase difference image IP may be input to the model M. In this case, it is preferable that the input unit 53 inputs any of the image IP1 or the image IP2 to the model M as the input image based on the position of the subject within the normal image IN detected in the subject detection process in the past. This is because the image IP1 and the image IP2 cause the brightness unevenness in the X direction (that is, the phase difference detection direction).

Since the image IP1 is generated by the phase difference pixel P1 that is shielded from light on the negative side in the X direction by the light shielding layer SF and that receives the luminous flux LF from the negative side exit pupil EP1 (see FIG. 3), the brightness on the negative side in the X direction tends to increase. Therefore, it is preferable that the input unit 53 inputs the image IP1 to the model M in a case where the subject is present on the negative side in the X direction with high brightness.

The image IP2 is generated by the phase difference pixel P2 that is shielded from light on the positive side in the X direction by the light shielding layer SF and that receives the luminous flux LF from the positive side exit pupil EP2 (see FIG. 3), the brightness on the positive side in the X direction tends to increase. Therefore, it is preferable that the input unit 53 inputs the image IP2 to the model M in a case where the subject is present on the positive side in the X direction with high brightness.

As described above, by inputting the image with the higher brightness between the image IP1 and the image IP2 to the model M as the input image according to the position of the subject in the past, the influence of the noise is relatively reduced in a region where the subject is present, so that the detection accuracy of the subject and the focusing position is improved.

The model M can infer the focusing position even in a case where not only the phase difference image IP but also any one of the image IP1 or the image IP2 is used as the input image.

The machine learning of the model M in a case where any one of the image IP1 or the image IP2 is used as the input image will be described. FIG. 15 is an example of a learning image and correct answer data of the model M. A plurality of learning images PT shown in FIG. 15 have different degrees of blurriness from each other. The learning image PT corresponds to the image IP1 or the image IP2.

The correct answer data is the shift amount $\delta$ (that is, the defocus amount) obtained by performing the correlation operation using two images corresponding to the image IP1 and the image IP2.

Figure 16:
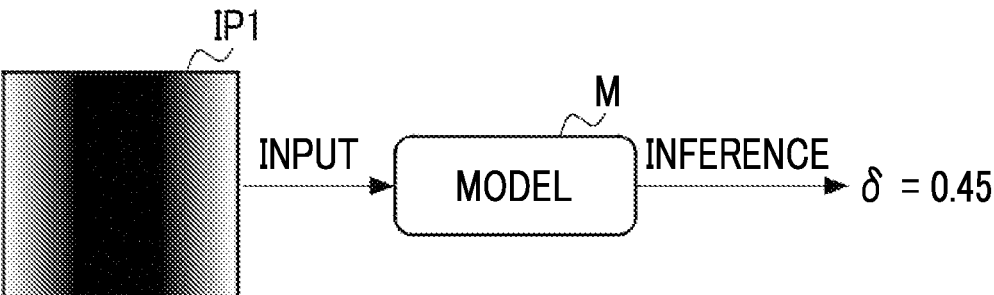
FIG. 16 is a diagram showing an example of an inference result output from the model.

In this way, by training the model M through machine learning using the learning image PT and the result of the correlation operation in association with each other as training data, the model M can infer the focusing position even in a case where any one of the image IP1 or the image IP2 is used as the input image. FIG. 16 shows an example of the inference result output from the model M in a case where the image IP1 is used as the input image. The model M can output the value of the shift amount δ that is not included in the training data as the inference result.

Figure 17:
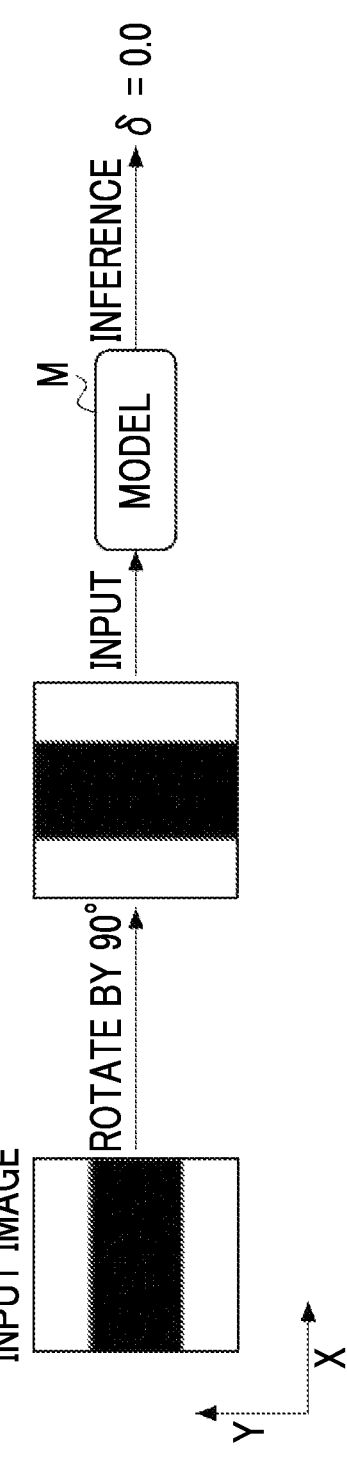
FIG. 17 is a diagram showing an example of rotating an input image and inputting the rotated input image to the model.

In addition, the model M that has been trained through machine learning using the training data shown in FIG. 15 has low inference accuracy for the input image including a pattern consisting of lines in the horizontal direction (that is, the phase difference detection direction) in which detection accuracy based on the correlation operation is low. Therefore, as shown in FIG. 17, the input unit 53 may rotate the input image and input the rotated input image to the model M. In the first focusing position detection step, the focusing position is detected based on the rotated input image.

In the example shown in FIG. 17, the input unit 53 rotates the input image by 90°, but the rotation angle is not limited to 90°. The input unit 53 need only rotate the input image such that a direction of a line included in the input image is a direction that is not parallel to the phase difference detection direction, and may set the rotation angle as an angle of 45° or the like.

In the above-described embodiment, the model M is composed of a single network (see FIGS. 9 and 14), but the model M may be composed of a combination of a plurality of networks.

In addition, in the above-described embodiment, one model M is stored in the memory 42, but a plurality of models that have been trained through machine learning using different pieces of training data may be stored in the memory 42. For example, a plurality of models may be stored in the memory 42, and the main control unit 50 may perform a selection process of selecting one model that is suitable for the phase difference detection direction of the phase difference pixels P1 and P2. In this case, the input unit 53 inputs the input image to the model selected through the selection process. The selection process corresponds to a "selection step" according to the technology of the present disclosure.

Figure 18:
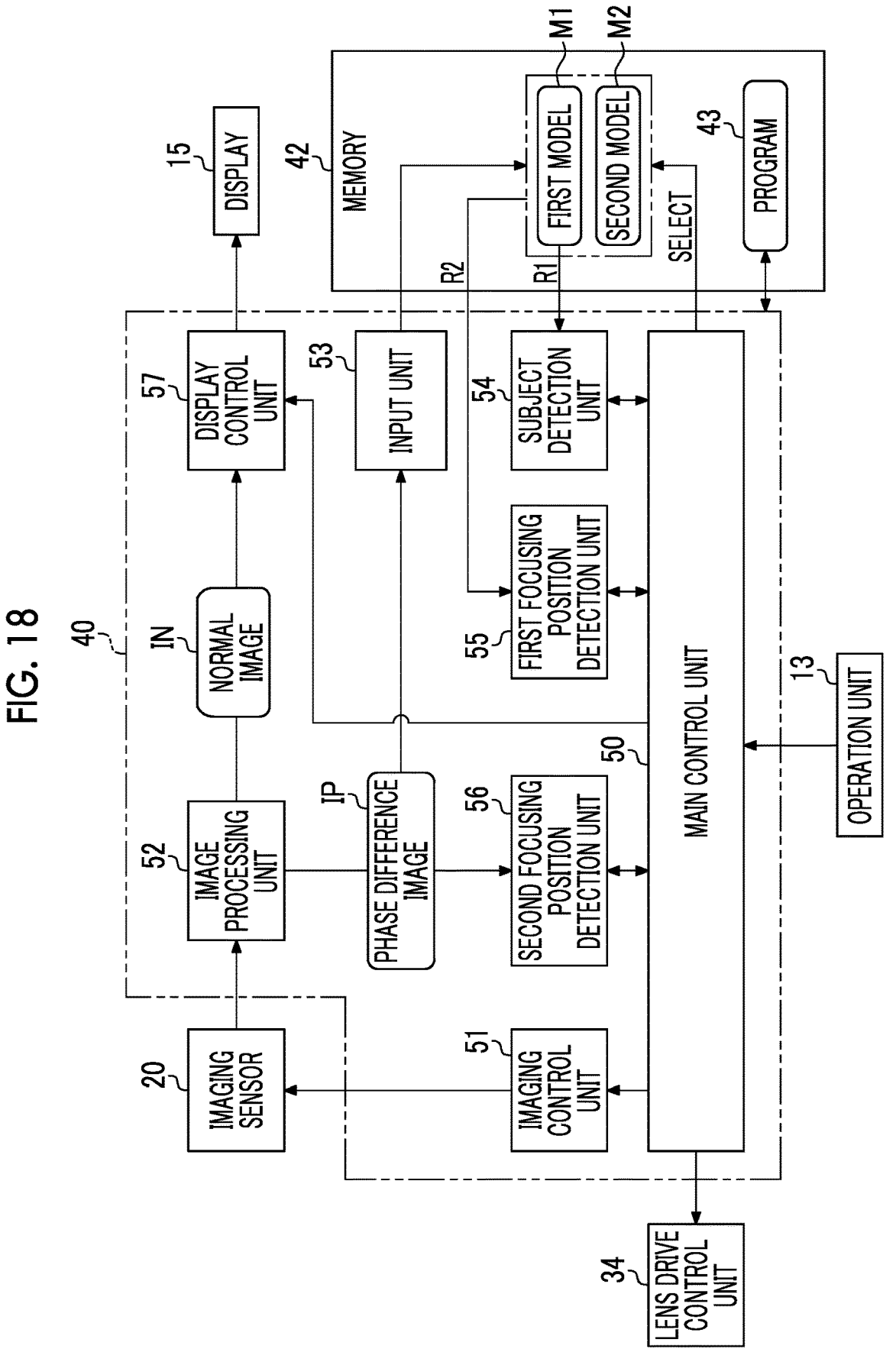
FIG. 18 is a diagram showing an example of storing a plurality of models in a memory.

For example, as shown in FIG. 18, a first model M1 and a second model M2 may be stored in the memory 42. The first model M1 is a model suitable for detecting the focusing position in a case where the phase difference detection direction is the horizontal direction. The second model M2 is a model suitable for detecting the focusing position in a case where the phase difference detection direction is the vertical direction. The first model M1 and the second model M2 have basically the same configurations as the model M of the above-described embodiment, but the first model M1 is configured to perform horizontal pooling in the second subnetwork, and the second model M2 is configured to perform vertical pooling in the second subnetwork.

The main control unit 50 selects any of the first model M1 or the second model M2 according to the phase difference detection direction of the imaging sensor 20 mounted in the imaging apparatus 10. The main control unit 50 selects the first model M1 in a case where the phase difference detection direction of the imaging sensor 20 is the horizontal direction, and selects the second model M2 in a case where the phase difference detection direction of the imaging sensor 20 is the vertical direction.

As described above, the phase difference detection direction of the imaging sensor 20 is not limited to the horizontal direction and may be the vertical direction. However, by storing a plurality of models corresponding to a plurality of phase difference detection directions in the memory 42 in advance, it is possible to select a model corresponding to the phase difference detection direction of the imaging sensor 20. As a result, since the memory 42 in which the plurality of models are stored can be used as a common component, the manufacturing of the imaging apparatus 10 is simplified.

The technology of the present disclosure is not limited to the digital camera and can also be applied to electronic devices such as a smartphone and a tablet terminal having an imaging function.

In the above-described embodiment, various processors to be described below can be used as the hardware structure of the control unit using the processor 40 as an example. The above-described various processors include not only a CPU which is a general-purpose processor that functions by executing software (programs) but also a processor that has a changeable circuit configuration after manufacturing, such as an FPGA. The FPGA includes a dedicated electrical circuit that is a processor which has a dedicated circuit configuration designed to execute specific processing, such as PLD or ASIC, and the like.

The control unit may be configured with one of these various processors or a combination of two or more of the processors of the same type or different types (for example, a combination of a plurality of FPGAs or a combination of a CPU and an FPGA). Alternatively, a plurality of control units may be configured with one processor.

A plurality of examples in which a plurality of control units are configured with one processor are conceivable. As a first example, there is an aspect in which one or more CPUs and software are combined to configure one processor and the processor functions as a plurality of control units, as represented by a computer such as a client and a server. As a second example, there is an aspect in which a processor that implements the functions of the entire system, which includes a plurality of control units, with one IC chip is used, as represented by system on chip (SOC). In this way, the control unit can be configured by using one or more of the above-described various processors as the hardware structure.

Furthermore, more specifically, it is possible to use an electrical circuit in which circuit elements such as semiconductor elements are combined, as the hardware structure of these various processors.

The contents described and shown above are detailed descriptions of parts related to the technology of the present disclosure and are merely an example of the technology of the present disclosure. For example, the above description related to configurations, functions, actions, and effects is description related to an example of the configurations, functions, actions, and effects of the parts related to the technology of the present disclosure. Therefore, it goes without saying that unnecessary parts may be deleted, new elements may be added, or replacements may be made for the contents described and shown above within the scope that does not depart from the gist of the technology of the present disclosure. Moreover, in order to avoid confusion and facilitate understanding of the parts related to the technology of the present disclosure, description related to common technical knowledge and the like that do not require particular description to enable implementation of the technology of the present disclosure is omitted from the contents described and shown above.

All documents, patent applications, and technical standards described in the present specification are incorporated by reference into the present specification to the same extent as in a case where the individual documents, patent applications, and technical standards were specifically and individually stated to be incorporated by reference.

What is claimed is:

1. A detection method used in an imaging apparatus including an imaging element that has a first pixel for generating a first signal and second and third pixels for generating second and third signals for detecting a phase difference, and a memory that stores a plurality of models trained through machine learning, the detection method comprising:
   a selection step of selecting one model, among the plurality of models, based on a type of phase difference detection of the second pixel and the third pixel;
   an input step of inputting a second image based on the second signal, a third image based on the third signal, or a fourth image based on the second signal and the third signal to the selected model as an input image;
   a subject detection step of detecting a subject included in a first image generated by the first signal, through the selected model on which the input step is executed; and
   a first focusing position detection step of detecting a focusing position with respect to the subject, through the selected model on which the input step is executed.

2. The detection method according to claim 1, further comprising:
   a second focusing position detection step of detecting the focusing position with respect to the subject by performing correlation operation using the second signal and the third signal.

3. The detection method according to claim 2,
   wherein the first focusing position detection step is executed according to a result of the second focusing position detection step or the subject detection step.

4. The detection method according to claim 1,
   wherein, in the input step, the input image is rotated and input to the selected model, and
   in the first focusing position detection step, the focusing position is detected based on the rotated input image.

5. The detection method according to claim 1, further comprising:
   a first readout step of reading out the first signal from the first pixel; and
   a second readout step of reading out the second signal and the third signal from the second pixel and the third pixel, independently of the first readout step.

6. The detection method according to claim 5,
   wherein an exposure amount of the second pixel and the third pixel read out in the second readout step is different from an exposure amount of the first pixel read out in the first readout step.

7. The detection method according to claim 6,
   wherein a readout rate of the second signal and the third signal in the second readout step is higher than a readout rate of the first signal in the first readout step.

8. The detection method according to claim 1,
   wherein, in the input step, any of the second image or the third image is input to the selected model as the input image based on a position of the subject detected in the subject detection step in a past.

9. The detection method according to claim 1,
   wherein the input image in the input step is the fourth image.

10. The detection method according to claim 1,
   wherein, in a case where a phase difference detection direction of the second pixel and the third pixel is a horizontal direction,
   the selected model
   executes horizontal pooling and vertical pooling on the input image in the subject detection step, and
   executes horizontal pooling on the input image in the first focusing position detection step.

11. The detection method according to claim 1,
   wherein the type of phase difference detection includes a phase difference detection direction of the second pixel and the third pixel, and
   wherein the selection step includes selecting, from among the plurality of models, a model suitable for the phase difference detection direction.

12. An imaging apparatus comprising:
   an imaging element that has a first pixel for generating a first signal and second and third pixels for generating second and third signals for detecting a phase difference;
   a memory that stores a plurality of models trained through machine learning; and
   a processor,
   wherein the processor is configured to execute:
      a selection process of selecting one model, among the plurality of models, based on a type of phase difference detection of the second pixel and the third pixel;
      an input process of inputting a second image based on the second signal, a third image based on the third signal, or a fourth image based on the second signal and the third signal to the selected model as an input image;
      a subject detection process of detecting a subject included in a first image generated by the first signal, through the selected model on which the input process is executed; and
      a first focusing position detection process of detecting a focusing position with respect to the subject, through the selected model on which the input process is executed.

13. A non-transitory computer recording medium storing a program for operating an imaging apparatus including an imaging element that has a first pixel for generating a first signal and second and third pixels for generating second and third signals for detecting a phase difference, and a memory that stores a plurality of models trained through machine learning, the program causing the imaging apparatus to execute:
   a selection process of selecting one model, among the plurality of models, based on a type of phase difference detection of the second pixel and the third pixel;
   an input process of inputting a second image based on the second signal, a third image based on the third signal, or a fourth image based on the second signal and the third signal to the selected model as an input image;
   a subject detection process of detecting a subject included in a first image generated by the first signal, through the selected model on which the input process is executed; and
   a first focusing position detection process of detecting a focusing position with respect to the subject, through the selected model on which the input process is executed.

* * * * *